(12) United States Patent
Wellman et al.

(10) Patent No.: US 7,002,154 B2
(45) Date of Patent: Feb. 21, 2006

(54) OPTICAL SYSTEM FOR A WIDE FIELD OF VIEW STARING INFRARED SENSOR HAVING IMPROVED OPTICAL SYMMETRY

(75) Inventors: William H. Wellman, Santa Barbara, CA (US); Joseph F. Borchard, McKinney, TX (US); Douglas Anderson, Richardson, TX (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 10/423,504

(22) Filed: Apr. 25, 2003

(65) Prior Publication Data
US 2004/0211907 A1    Oct. 28, 2004

(51) Int. Cl.
*G01J 5/02* (2006.01)
(52) U.S. Cl. ..................... 250/352; 250/252.1
(58) Field of Classification Search ................ 250/352, 250/252.1, 332, 330, 359
See application file for complete search history.

(56) References Cited

U.S. PATENT DOCUMENTS

| | | | |
|---|---|---|---|
| 4,783,593 A | | 11/1988 | Noble |
| 4,820,923 A | | 4/1989 | Wellman |
| 4,990,782 A | * | 2/1991 | Wellman et al. ............ 250/352 |
| 5,639,955 A | * | 6/1997 | Anthony ..................... 73/1.01 |
| 5,793,538 A | * | 8/1998 | Cameron et al. ........... 359/731 |
| 6,121,618 A | | 9/2000 | Morris |
| 6,737,639 B1 | * | 5/2004 | Huniu ..................... 250/252.1 |
| 2004/0212877 A1 | * | 10/2004 | Borchard .................... 359/359 |

FOREIGN PATENT DOCUMENTS

| | | |
|---|---|---|
| EP | 0 697 584 | 2/1996 |
| EP | 0 747 744 | 12/1996 |

\* cited by examiner

*Primary Examiner*—Otilia Gabor
(74) *Attorney, Agent, or Firm*—William C. Schubert; Karl A. Vick

(57) ABSTRACT

A wide-angle IR imaging system (1A) has an entrance aperture (40) for admitting IR from a scene and a dewar (4A) that contains a coldshield (3) that encloses a cooled IR detector (2) disposed at an image plane (2A). The dewar includes a dewar window (4), and an optical axis of the IR imaging system passes through the dewar window and the image plane. The IR imaging system further includes a plurality of uncooled optical elements (22, 24, 26, 28) disposed along the optical axis between the entrance aperture and the dewar window, and a plurality of generally annular reflector segments (18A, 18B) disposed around the optical axis between the dewar window and the entrance aperture. Each of the reflector segments has a reflective surface that faces the dewar window. An opening through an outermost reflector segment furthest from the dewar window defines an effective cooled aperture stop, or warm stop (20A) of the IR imaging system, and at least one of the optical elements (22) is disposed between the effective cooled aperture stop and another one of the reflector segments (18A) that is located nearer to the dewar window. In the preferred embodiment the at least one optical element, and the reflector segment that is located nearer to the dewar window, are comprised of a single monolithic body (31) that has a compound optical surface.

36 Claims, 11 Drawing Sheets

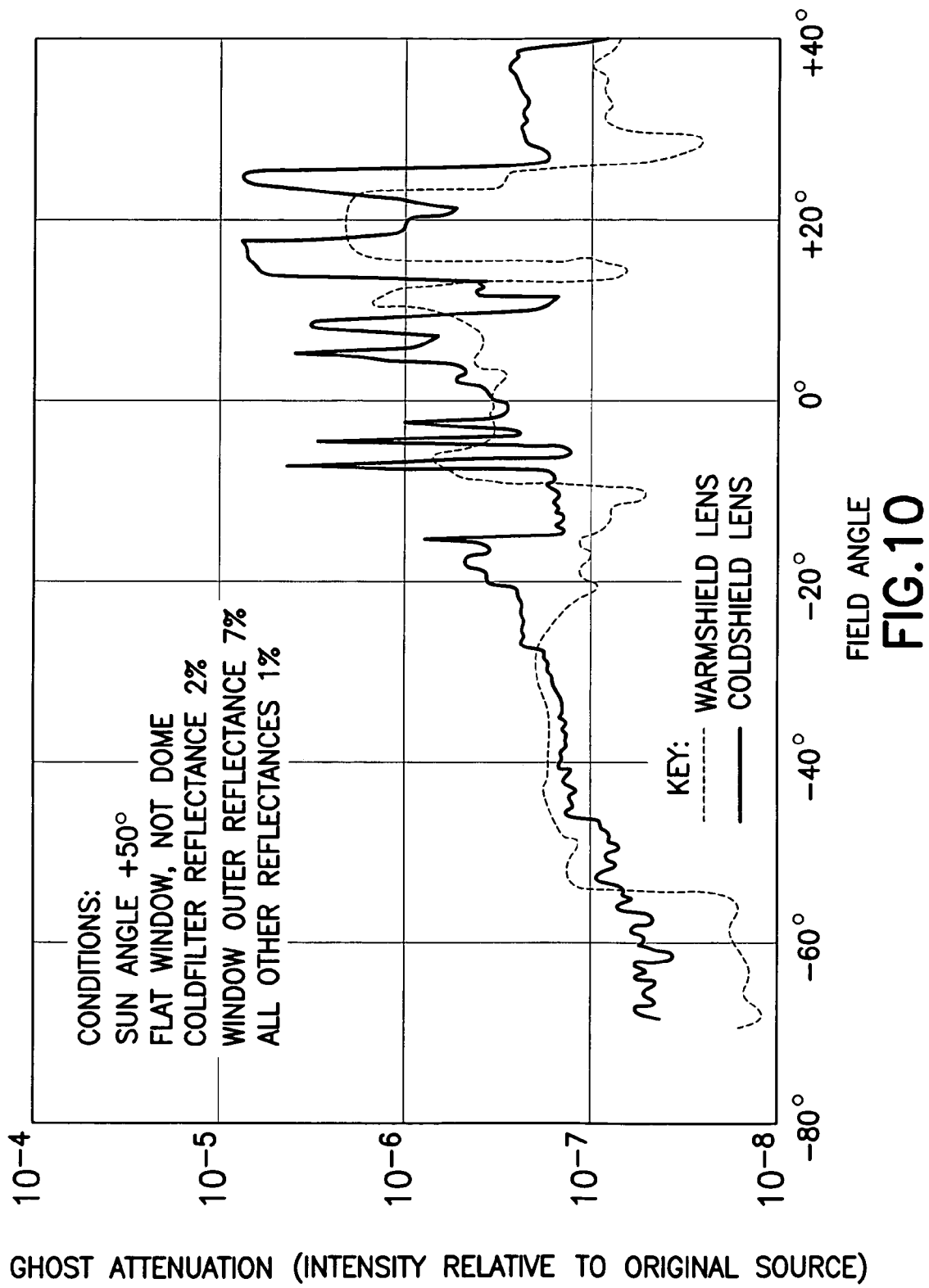

OPTICAL SYSTEM FOR A WIDE FIELD OF VIEW STARING INFRARED SENSOR HAVING IMPROVED OPTICAL SYMMETRY

TECHNICAL FIELD

This invention relates generally to optical assemblies used for detecting infrared radiation (IR) and, more specifically, relates to wide-angle, compact optical assemblies that include a combination of a warmshield and a coldshield disposed in front of a cryogenically-cooled IR focal plane located within a dewar, i.e., within a thermally isolated containment vessel that aids in maintaining the cryogenic temperature of the focal plane and the associated IR detector device.

BACKGROUND

Infrared detector-based surveillance sensors ideally exhibit an extremely wide angular coverage, an ultra-compact size and high sensitivity and high image quality over the entire field-of-view (FOV). Typical applications include, but are not limited to, missile warning systems (MWS) and infrared search and track (IRST) systems. Another application of interest includes day/night area surveillance cameras that use optically-based wide-angle coverage, as opposed to mechanical scanning, for compactness and ruggedness.

Conventional wide-angle lens systems are typically used with dewar and coldshield technology. Due to the often-required small size of the IR sensor device itself, the use of re-imaging optics is generally precluded for many applications, resulting in the presence of only a single aperture stop or pupil for the entire optical system. In practice, the aperture stop is a "coldstop" located within the dewar to maintain infrared sensitivity. However, the resultant optical asymmetry complicates the lens design, thereby limiting image quality and image illumination. Further, if high image quality is maintained then a small physical size is difficult to achieve. In addition, the need for aberration corrections results in more stringent manufacturing tolerances, which increases cost.

One example of a conventional wide-angle IR sensor 1 is shown in FIG. 1. The sensor 1 includes an IR detector 2 located at an image plane 2A. The IR detector 2 is located within a coldshield 3 having an opening that defines a coldstop 3A. A dewar window 4 of a dewar housing 4A, also referred to herein simply as the dewar 4A, separates the coldstop 3A from uncooled optical components 5 that include a multi-element (four elements in this case) lens comprised of lens elements 6, 7, 8 and 9. A protective sensor dome 10 or window 11 defines the entrance to the IR sensor 1. Representative dimensions (inches) for a f:2.0 lens with 150° diagonal field-of-view coverage are: x=1.9, y=1.9 and z=2.6. The IR detector 2 can be said to be a "staring" type of detector, as the IR arriving from the scene is not scanned across the radiation-responsive surface of the detector 2.

In this embodiment the coldstop 3A is located at the true coldshield 3, which lies within the dewar 3. Designed for compactness, the distance from the focal plane 3A to the dome 10 exterior surface is only 1.9 inches. The window 11 may be employed if the sensor depth were increased, and if the sensor opening were increased to 2.6 inches (clear aperture diagonal) to accommodate the outward spread of the imaging rays with distance from the coldstop 3A.

This conventional design can be said to be optically asymmetric. This can be seen if one were to consider, by analogy, the aperture stop (coldstop 3A) as the fulcrum or pivot point of a beam having at one end the image plane 2A, and at the other end the front surface of the sensor dome 10. As can be appreciated, if the optical system where symmetric then the aperture stop would be located between lens elements 8 and 7, i.e., mid-way between the image plane 2A and the front surface of the sensor dome 10.

A second prior art sensor 1' is shown in FIG. 2. The lens achieves a similar small size, and also uses a single stop 3A in the coldshield 3. Although designed for use with a flat window 11, a low-power dome 10 could be used instead (as in the FIG. 1 sensor), to reduce the aperture size of the sensor housing. Representative dimensions (inches) for an approximate 120° field-of-view are: x=1.7 and y=2.4. This lens produces a highly distorted image mapping that requires extensive electronic compensation. Otherwise, the performance and size are similar to that of the FIG. 1 lens.

A third prior art design is shown in FIG. 3A, and reflects the sensor shown in the now commonly-assigned U.S. Pat. No.: 4,820,923, "Uncooled Reflective Shield for Cryogenically-Cooled Radiation Detectors", by William H. Weilman. A virtual coldshield, or "warmshield", is used to avoid the large size of the coldshield 3 of the conventional design (FIG. 3B). One problem solved by the invention disclosed in U.S. Pat. No.: 4,820,923 was the presence of the large thermal mass and cantilevered weight of the conventional coldshield 3. The problem is solved by the use of the multiple toroidal reflectors, enabling the coldshield mass and length to be reduced. One significant advantage of the warm shield design of FIG. 3A is that the cryogenically cooled cold shield 3 can be made smaller, and can require less cooling, than the conventional cold shield 3 design of FIG. 3B.

It is noted that in FIG. 4 of U.S. Pat. No. 4,820,923 an optical element 30 is shown disposed between toroidal segments 26b and 26c (see column 6, lines 31–57). However, a consideration is not made for the advantages of lens symmetry that are important in a wide-angle optical system. FIG. 3A of this patent application shows that the geometry of this telephoto optical system is quite different than that of wide-angle optics.

Problems that arise when designing a wide FOV IR imaging system, that is intended to have a compact size, include a non-uniformity of sensitivity across the wide field-of-view, increased ghost image generation and limitations on spectral bandwidth.

A need thus exists to provide a wide FOV IR imaging system with a compact shape and improved optical characteristics that optical symmetry can help achieve. Prior to this invention, this need was not adequately addressed.

SUMMARY OF THE PREFERRED EMBODIMENTS

The foregoing and other problems are overcome, and other advantages are realized, in accordance with the presently preferred embodiments of these teachings.

Disclosed is an IR imaging optical system that exhibits improved uniformity of sensitivity across a wide field-of-view, improved ghost image rejection, a broader spectral bandwidth, and a smaller physical size relative to conventional optical systems.

An aspect of this invention employs an integrated lens and dewar, and places the lens stop (aperture stop) within the lens, as opposed to within the dewar. By moving the aperture stop out of the dewar to be within the optics, this approach significantly improves the optical symmetry, which in turn reduces lens size and also improves lens performance. This invention represents a significant advancement over conventional uncooled radiation shield technology used with telephoto optics for infrared viewers and missile seekers, as in U.S. Pat. No. 4,820,923. The improved optical symmetry results in the ability to realize a wide-angle optical system, whereas for the conventional telephoto optical systems the reduction of coldshield size was a key advancement.

By providing an improved balance of the optical power about the lens stop the optical performance is improved, particularly for wider, off-axis angles. Illumination rolloff is reduced by placing the lens stop further from the image plane, which reduces ray angles through the stop. Affordability is improved by relaxing positioning and other tolerance requirements, made possible by the more symmetrical design. In addition, the lesser ray angles improve affordability and performance of the lens coatings. A further benefit is that access is provided for a thermal-reference "flag" or "paddle" for uniformity calibration, such as is used in larger infrared cameras, since the lens stop is physically positioned outside of the dewar. A thermal reference near the stop is preferred, as all detectors see the same region of the reference surface at the same time, which gives the same irradiance to all detectors despite temperature gradients and imperfections on the reference surface.

Disclosed herein is an IR imaging system having an entrance aperture for admitting IR from a scene and a dewar that contains a coldshield that encloses a cooled IR detector disposed at an image plane. The dewar includes a dewar window, and an optical axis of the IR imaging system passes through the dewar window and the image plane. The IR imaging system further includes a plurality of uncooled optical elements disposed along the optical axis between the entrance aperture and the dewar window, and a plurality of generally annular reflector segments disposed around the optical axis between the dewar window and the entrance aperture. Each of the reflector segments has a reflective surface that faces the dewar window. An opening through an outermost reflector segment furthest from the dewar window defines an effective cooled aperture stop of the IR imaging system, and at least one of the optical elements is disposed between the effective cooled aperture stop and another one of the reflector segments that is located nearer to the dewar window.

In the preferred embodiment, each reflector segment is formed on the periphery of a lens element, as a single monolithic body that has a compound optical surface. The monolithic body is comprised of a material selected for fabricating a refractive lens element, and the compound optical surface exhibits a centrally located convex portion defining the lens element surrounded by a generally toroidal surface region having a reflective coating that defines the reflector segment. The combining of surfaces on a single element assures precision alignment of the reflectors with the optics, and avoids the need for additional lens mounting structure. While it is preferred that all reflector elements be so combined with lens elements, this type of construction is not essential to the operation of the invention. Thus, some or all of the reflectors can be provided as separate elements of the optical system, and assembled with the lens elements using standard optical mounting techniques.

This invention further enables the positioning of a blackbody calibration device for radiometric calibration, because the stop is physically accessible in a clear space between lens elements.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3A is a cross-sectional view of a prior art IR sensor that includes a plurality of warmshields, while

FIG. 10 is a graph that plots ghost image attenuation versus field angle and shows an improved suppression of ghost images by the IR sensor of FIG. 4;

DETAILED DESCRIPTION OF THE PREFERRED EMBODIMENTS

Figure 1:
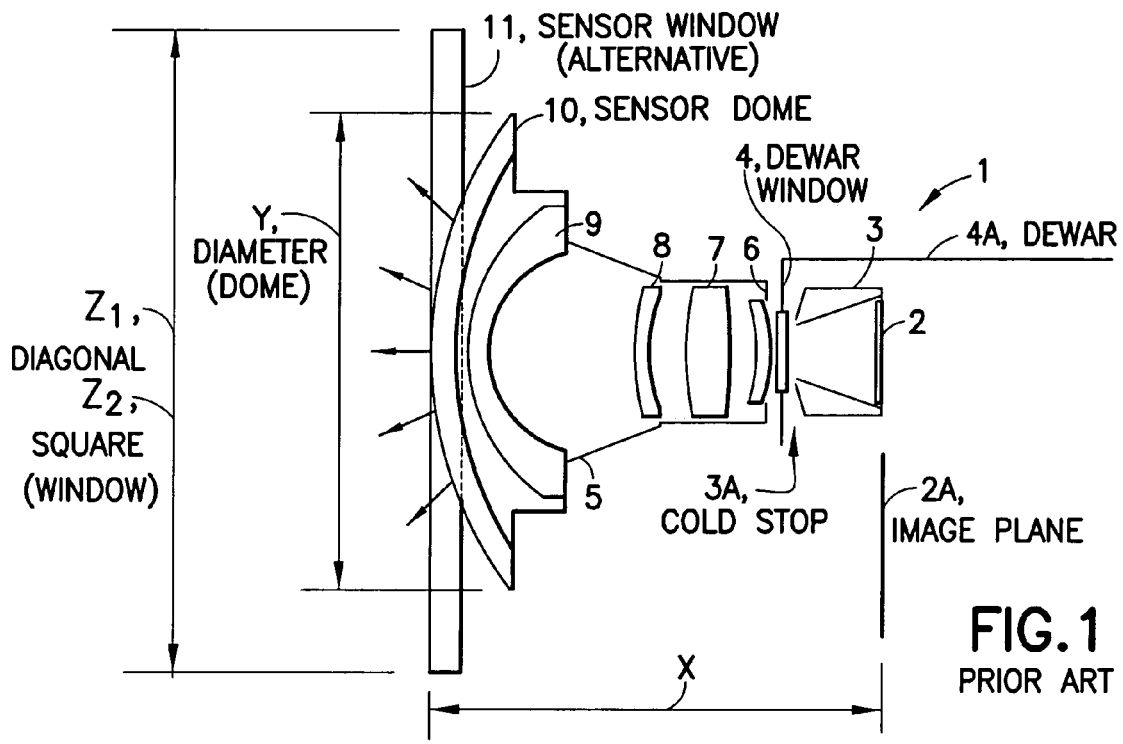
FIG. 1 is a cross-sectional view of a first embodiment of a prior art wide-angle IR sensor.

Before describing this invention in detail, a brief discussion will be made of optical stops in general, and more specifically of optical stops IR imaging systems. This discussion will provide the reader with a better appreciation of the benefits provided this invention.

In every lens, there are physical apertures that limit the passage of energy to the image. Each lens element has a limited clear aperture, as do baffles in the lens and other structures in the sensor. One of these apertures will most limit the diameter of the cone of energy that the lens can pass to the image. This aperture is termed the "aperture stop", and its size determines the irradiance at the image. Another aperture typically limits the angular extent of the image, and this aperture is termed the "field stop". Apertures also are used to block stray radiation from reflecting off of lens mounts and structure and onto the image, and these are generally termed "baffles".

The placement of an optical stop is important to system performance. Infrared sensors require the stop to be "cold", since it is thermal energy that is being detected. This is unlike visible sensors, which require only that the stop be "black", i.e., non-transmissive, non-reflective and non-radiative in the visible spectrum. Infrared stops, like infrared detectors, must be cooled to cryogenic temperatures. This means that the stop is formed by a "coldshield" structure that is mounted with the detector, atop the cold focal plane. These cold elements must be sealed from the atmosphere, to block condensation or frosting due to humidity, as well as to lessen warming due to convective heat transfer. Typically, a vacuum "dewar" is used to enable cooling to cryogenic temperatures where gas liquefication, as well as water frosting, occurs.

It is impractical to enclose lens elements of an infrared system within the cryogenic detector package or dewar. If mounted on the cold structure, the added mass of the lens elements impedes cooldown time, delaying sensor readiness. Also, the added mass would require stiffening supporting structures in the dewar, which contradicts their purpose of providing thermal isolation. Manufacturing tolerances require the lens elements to be held in one mount assembly, not mounted partially inside and partially outside the dewar. Mounting of the entire lens assembly in the dewar makes it inaccessible and difficult to focus, and also compromises the vacuum integrity.

For any optical system, placement of the aperture stop affects imaging performance. Symmetries about the optical stop help maintain image quality at larger off-axis angles, which is very important in wide-angle optical systems. Insofar as sensor physical size allows, symmetries can be introduced by relaying the stop somewhat symmetrically about the lens. For example, a true stop located near the image plane can be imaged (as a pupil) on the front window of the sensor, at the same time that the optical system images the scene on the image plane. However, ultra-compact sensors cannot tolerate the physical size of such optical systems, and thus have only the aperture stop. With prior-art optics, using a true coldshield as the stop, the stop is located very asymmetrically within the optical system. Indeed, it must be closer to the image plane than the last lens element, with enough space between that element to accommodate the dewar window and necessary assembly tolerances.

As will now be described, this invention allows the aperture stop to be located more symmetrically within the lens, which improves performance. While the technique of this invention follows to some degree that set forth in the above-referenced U.S. Pat. No. 4,820,923, there are significant differences. For example, U.S. Pat. No. 4,820,923 primarily considers the advantages of physical performance such as thermal inertia, physical mass on the cold structure, and related thermal and structural concerns. While it discloses placing a lens between the aperture stop and the image plane, it assumes that the lens and the warmshield will be within the dewar. This invention specifically seeks to improve optical performance by relocating the aperture stop outside of the dewar, and within a wide angle lens assembly. Rather than specifically addressing aspects of dewar performance, such as heatload and thermal mass, this invention improves optical performance of an infrared system that is desired to be implemented in a compact package. This invention employs wide-angle optics, and addresses a unique design problem of compact wide-angle sensor design. An aspect of this invention provides performance improvements that are attained by relocating the aperture stop to a more symmetrical location, while relying on the teachings of prior U.S. Pat. No. 4,820,923 to assure good physical attributes of thermodynamics and structure.

Figure 4:
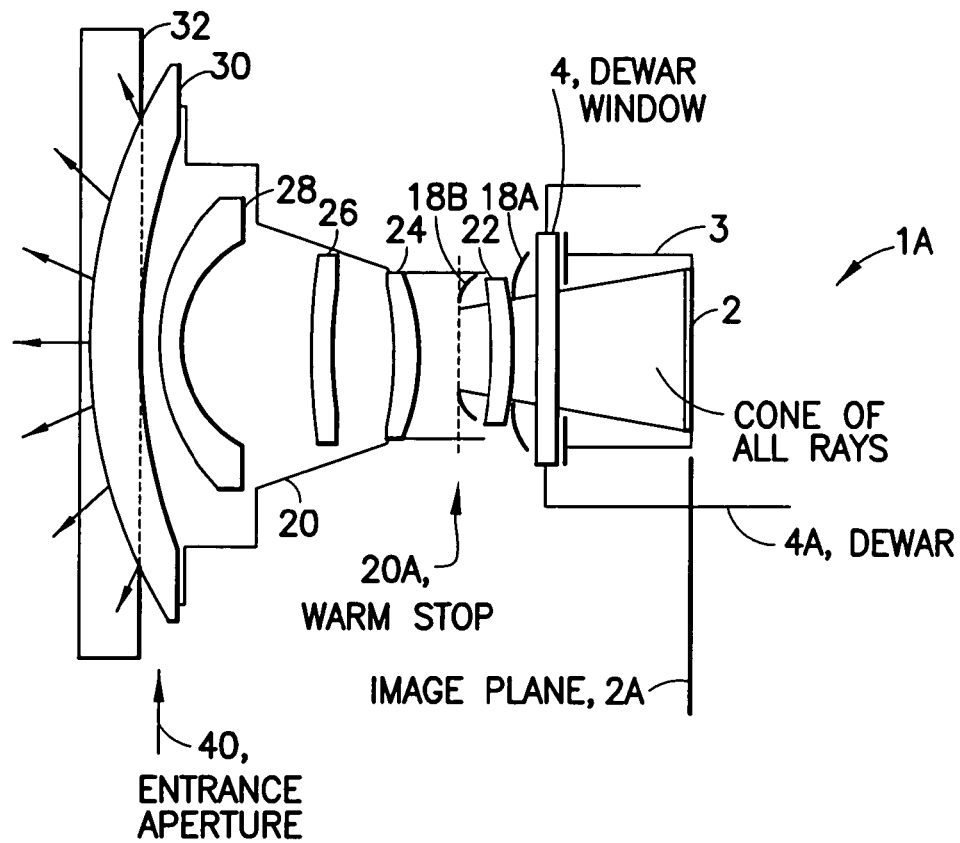
FIG. 4 is a cross-sectional view of an improved wide-angle IR sensor in accordance with this invention, the IR sensor having a segmented warmshield structure and a lens element of a multi-lens optical assembly disposed between two warmshield segments forming a warm aperture stop.

FIG. 4 illustrates an improved IR sensor 1A in accordance with this invention, also referred to as an IR imaging system 1A, that preferably, but not necessarily, is embodied as a wide-angle IR imaging system. The IR imaging system 1A has an entrance aperture 40 for admitting IR from a scene of interest. In the IR sensor 1A the aperture stop is placed within a multi-element lens, comprised of lenses 22, 24, 26 and 28 contained within optical assembly or housing 20, while still providing proper coldshield operation. A sensor dome 30 or a flat window 32 is located at the entrance (entrance aperture) to the sensor 1A. The lens elements 22, 24, 26 and 28, and the dome 30 or flat window 32 are comprised of suitable IR transmissive materials, such as germanium or silicon.

The coldshield, required for the desired optical effect, is created optically, instead of physically, by the use of shaped, preferably toroidal or substantially toroidal, mirror elements or reflectors 18A and 18B. Each of the reflector segments 18A, 18B thus has a generally annular reflective surface facing the dewar window 4, where the reflective surface surrounds an IR transmission path region through the reflector segment. The IR transmission path region may be an opening made through the reflector segment, or it can comprise a transmissive optical element in accordance with the embodiment shown in FIGS. 11B and 12.

In the design of the sensor 1A attention is paid to the precise image formation of the optical coldshield at the desired aperture stop location, just as one must design with care the image formation of the scene at the desired focal plane 2A location. Such optical coldshields, or "warmshields", are best created with toroidal reflectors 18A and 18B that avoid re-imaging the IR detector 2 upon itself, thus avoiding the formation of unwanted "ghost" images.

Figure 5:
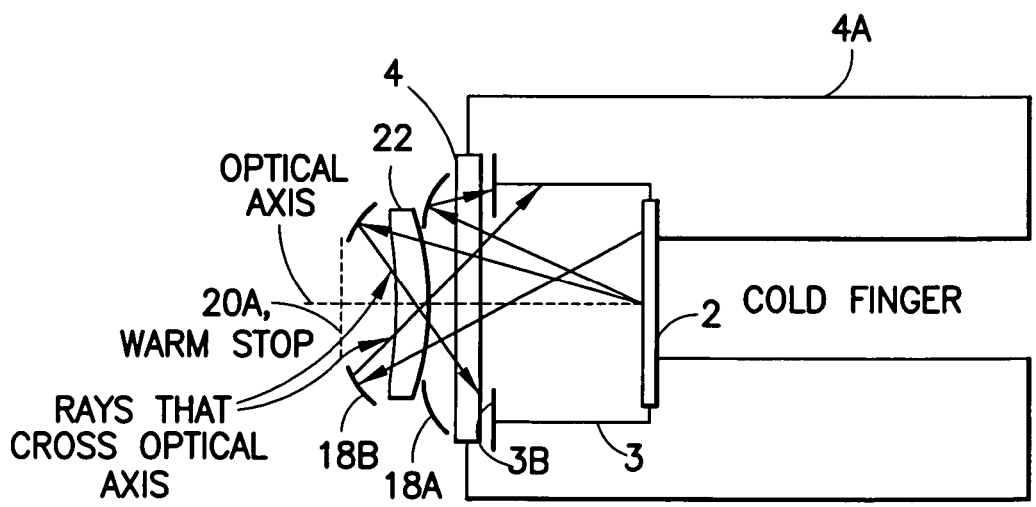
FIG. 5 is a diagram illustrating ray reflections from a focal plane to the warmshield of FIG. 4.

In accordance with this invention, the warmshield is constructed with the shaped mirror elements 18A and 18B that face the cold focal plane 2A. As is best seen in FIG. 5, the mirror elements 18A and 18B create an equivalent coldshield by imaging a cold surface of the coldshield 3. The coldstop, or warmstop 20A, is placed within the multi-element lens, and is made to appear cold by action of the reflector elements 18A and 18B. The warmstop 20A is defined by the aperture through the outermost (relative to the image plane 2A) mirror element 18B, which is smaller than the aperture through the innermost mirror element 18A, and thus defines the aperture stop of the sensor 1A, as was discussed above.

In the embodiment of FIG. 4, and referring also to FIG. 5, the physical coldshield 3 within the dewar 4A lies close to the image plane 2A, and has a darkened forward face 3B that "fills" the virtual coldshield that is formed by the reflectors 18A and 18B. At least two reflectors 18A and 18B are used in order to capture all non-imaging rays that pass through the physical coldshield 3, without enlarging the optics significantly. One, two or more reflectors can be used in this invention. In the embodiment of FIG. 4 the outermost reflector 18B defines the aperture stop 20A, while the innermost reflector 18A and coldshield opening within the outer face 3B of the coldshield 3 are made large enough to avoid vignetting any imaging rays. The opening within the forward face 3B of the coldshield 3 is also designed to block as many out-of-field rays as possible. In this embodiment the out-of-field rays are captured by the true coldshield 3, either directly (as is usual) or indirectly by reflection. These principles are more clearly illustrated in FIG. 5, where it can be seen that the multiple toroidal reflectors 18A and 18B serve to reduce the size of the warmshield. Reflection across the optical axis avoids self-blockage by the segmented reflector structure, and reflection downward from the innermost reflector segment 18A reduces window ray angles, thereby improving transmission. Between the reflectors 18A and 18B is one of the lens elements (lens element 22 in this case) of the optical system. It should be noted that this invention is not limited to placing only a single lens element within the reflectors, nor is it limited to the use of only two reflectors.

The reflecting surfaces of the reflectors 18A and 18B preferably have a generally toroidal shape, and are used to image each point on the detector array 2 onto the cold surface surrounding the detector array 2. This cold surface is the outer face 3B of the physical coldshield 3 within the dewar 4A. However, this feature may be omitted if warmshield-reflected rays are intercepted by some other cold or absorptive surface, such as the interior of the coldshield 3. The outer face 3B of the coldshield 3 is preferably made optically "black", i.e., absorptive in the spectral region of interest. The toroidal reflectors 18A and 18B are designed to prevent reflections from the detector array 2 from mapping back onto the detector array 2, and thereby reduce the generation of ghost images. The use of spherical reflectors is avoided, as they suffer from ghost image problems simply because reflections from the detector array 2 would be mapped back onto the detector array. Instead, a proper toroid design maps the detector array 2 onto the coldshield face 3B, for all ray angles that contribute to the image. Rays at more extreme angles, outside the cone of all rays shown in FIG. 4, may be safely mapped onto the detector array 2, for they originate only from cold objects within the coldshield 3 itself.

As is discussed in the above-referenced commonly-assigned U.S. Pat. No. 4,820,923, "Uncooled Reflective Shield for Cryogenically-Cooled Radiation Detectors", by William H. Wellman, incorporated by reference herein in its entirety, a toroid focuses the rays radially, which reduces the coldshield size. However, the toroid also disperses the rays circumferentially, which reduces sensitivity to imperfections in the warmshield optical train. This defocus effect reduces sensitivities to dust on the surface of the dewar window 4, to imperfections in the window 4 and coldshield 3 surface coatings, and to thermal gradients in the coldshield 3, even if the true coldshield lies near the window 4. Without the circumferential defocusing, the sensor 1A may be vulnerable to extraneous patterns on the focal plane 2A, causing "ghost" images of these artifacts.

This invention exploits the use of the toroidal reflectors of the previous Wellman invention disclosed in U.S. Pat. No. 4,820,923, while also recognizing that compact, wide-angle lenses can benefit more from a balancing of optical power than from reducing coldshield mass and size. The balancing of optical power also eliminates the difficulty of projecting the coldstop outside of the lens, close to the image plane 2A, which is particularly difficult to accomplish with the short focal length required for realizing a compact lens of a wide-angle IR sensor 1A.

As employed herein, a wide-angle or wide field-of-view IR sensor is one having a FOV of about 30 degrees or greater. By example, the IR sensor 1A is maybe designed to have a FOV of 150 degrees.

It should be noted that if the size constraints permit, the foregoing problems could be resolved by the use of relay optics that create a stop image on either side of the lens. While this would achieve a balanced construction, it would do so in a much larger lens than is feasible with a compact wide FOV IR sensor.

As was shown in FIG. 5, for the wide-angle IR sensor 1A in accordance with the preferred embodiments of this invention, one of the reflectors 18, specifically the reflector 18A, is oriented such that rays do not cross the optical axis when reflected upon the coldshield outer face 3B. This is desirable, since having all reflected rays cross the optical axis in a wide-angle sensor would result in large angles of incidence that would impair dewar window 4 transmission and coldshield 3 absorptance, and would also foreshorten the coldshield 3 radial width, thereby complicating the reflector optical design with more stringent imaging requirements. In addition, the aperture sizes and focal lengths are sufficiently small that lens diameters are less critical than for conventional telephoto systems. Moreover, ray angles are so large that off-axis absorption and reflectance effects are a greater concern than for telephoto systems.

The heatload on the cold stage is reduced by the warmshield reflectors 18A and 18B, which appear, by reflection, to be at cryogenic temperatures. This is an important benefit that has not been recognized in the prior art. The heatload is kept low by maximizing the inband reflectivity of the reflectors 18A and 18B. Reflectances of 99.5% are attainable, even with production reflectors, and thus reject heat more effectively than the gold-plated exteriors of typical coldshields.

Figure 6:
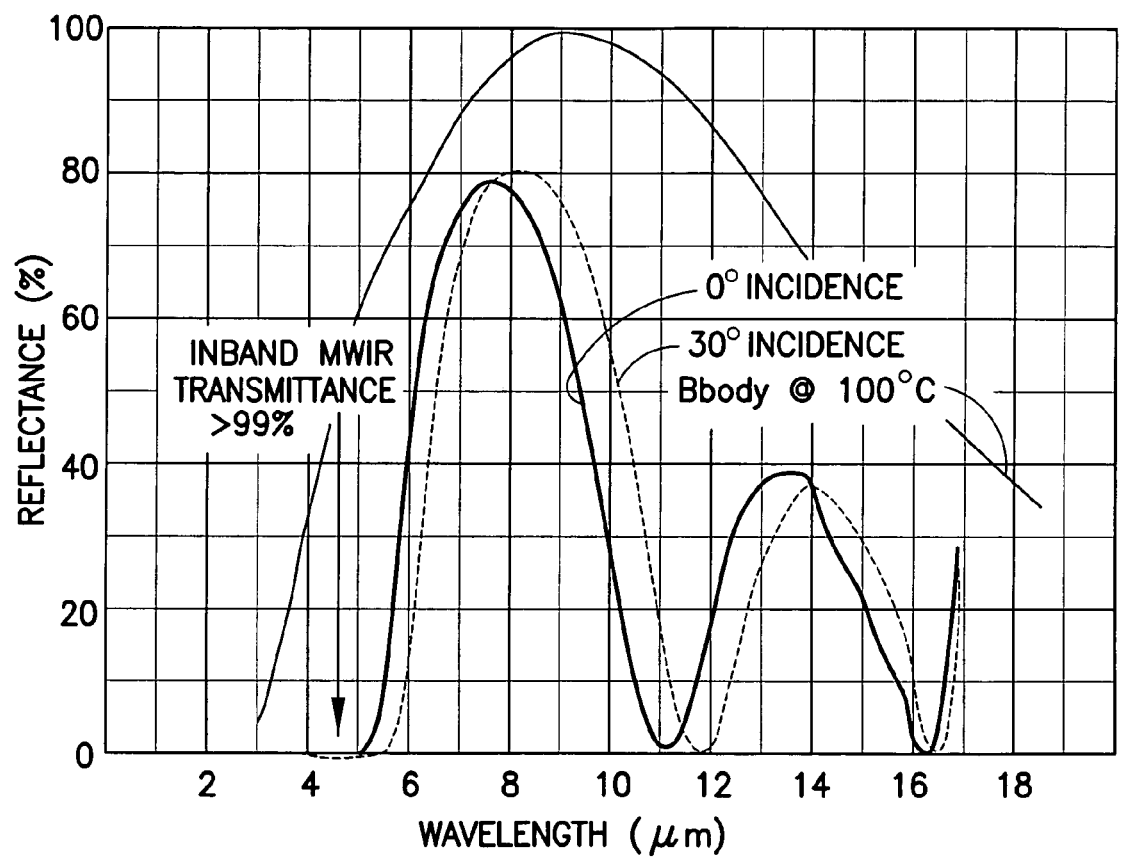
FIG. 6 is a graph that plots reflectance versus wavelength and shows selectively reflective dewar window coatings.

Heatload also is lowered by maintaining high inband transmittance and low inband emmitance in the dewar window 4. This is important in warmshield systems, in which the forward outer surface 3B of the coldshield 3 to absorb infrared radiation, since this added surface faces warm sensor parts that would otherwise undesirably increase the heatload. One technique to achieve low emmitance is to use silicon in place of germanium for the dewar window 4. Low reflectance can be achieved by coating the dewar window 4 with a spectral reflector that maintains low inband reflections, while blocking out-of-band thermal energy from reaching the cold interior. The characteristics of two such filters is shown in FIG. 6. In addition, heat from the intense short-wavelength energy from the sun can be blocked with a spectral filter on any of the window or lens elements.

The heatload can be further reduced by making the coldshield external face 3B selectively absorptive at wavelengths within the signal passband, and less absorptive for out-of-band flux. In place of conventional black paint, so-called "black mirror" coatings can be used to absorb strongly in the spectral passband of the sensor 1A, while reflecting strongly at other wavelengths. In order to prevent the formation of ghost images introduced by specularity in these reflections, modest surface roughening can be applied before the black mirror coating to block any specular reflections that may result in the formation of ghost images. Vapor honing is one suitable method of achieving a controlled surface roughness.

Figures 7A, 7B:
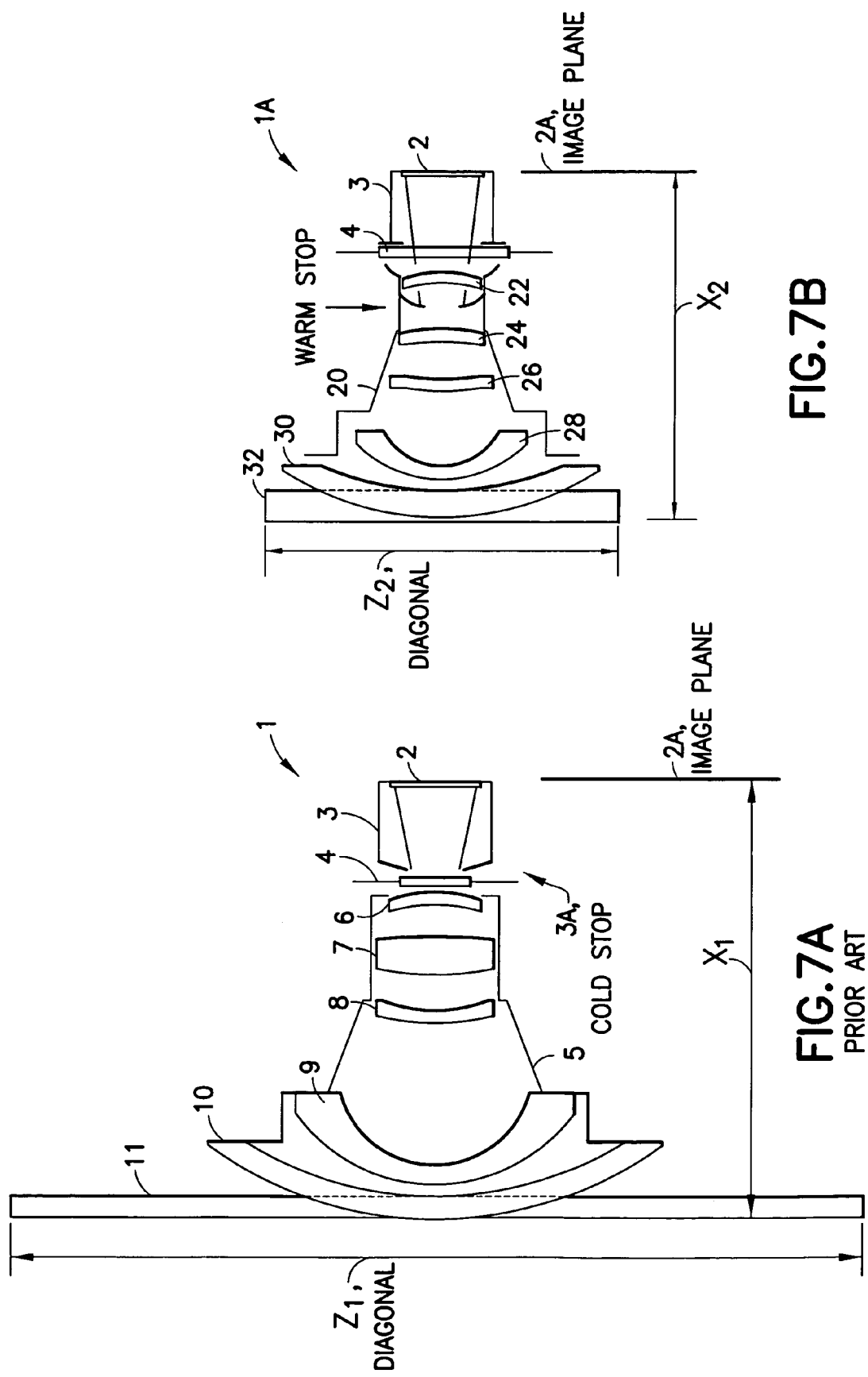
FIG. 7A is the cross-section view of the conventional wide-angle IR sensor and is contrasted with the cross-sectional view of the presently preferred wide-angle IR sensor of FIG. 7B for showing the significant reduction in required size.

The reduction in size of the improved IR sensor 1A in accordance with this invention is made apparent by comparing the prior art design of FIG. 7A with the improved design of FIG. 7B, with each sensor providing the same FOV. Representative dimensions (inches) are X1=1.8, X2=1.4, Z1=2.6, Z2=1.4. The X1 and X2 dimensions indicate the overall distance from the outer window 11 surface to the image plane 2A, and the diagonal size of the window clear aperture that is required to obtain a 150° field-of-view.

The improved compactness is additionally beneficial in that the improvement in optical balance of the IR sensor 1A of FIGS. 4 and 7B permits the use of a 10% larger collecting aperture (f/1.9 vs. f/2.0), which yields approximately a 10% increase in the signal from distant objects (small objects) that the IR sensor 1A is to detect.

Significantly, the improved IR sensor 1A can use either the flat window 32 or the dome 30. The flat window 32 is preferred for some applications, as it is less expensive to fabricate than the dome 30, and is also more readily replaced in the field.

In contrast, the conventional IR sensor design typically requires the use of the dome 10, as the flat window 11 is made impractically large by the ray bundle divergence from the aperture stop that is located well outside the lens, i.e., within the coldshield 3.

Thus, the use of this invention resolves a problem with those wide-angle sensors that are too compact for pupil re-imaging. In such systems, rays steadily diverge from the stop outward into object space. When the stop is located closer to the image plane, all of the lens elements become larger as the rays diverge from the stop towards object space, making the window very large. With this invention, the stop is located inside the lens, so the elements and the window become significantly smaller as the distances are reduced.

Since the lens 28 next to the dome 30 or window 32 is smaller (as in FIG. 4), increased curvatures are possible. This aids in defocusing unwanted ghosts reflecting back from this lens surface, and then reflecting forward from the dome 30 or window 32 towards the image plane. Defocusing is a fundamental technique for diminishing intensity of ghost images, and it is severely constrained when the lens elements have less variation in curvature. With this invention, the lens can be smaller and have more variation in curvatures, helping to reduce ghost images.

Figure 13:
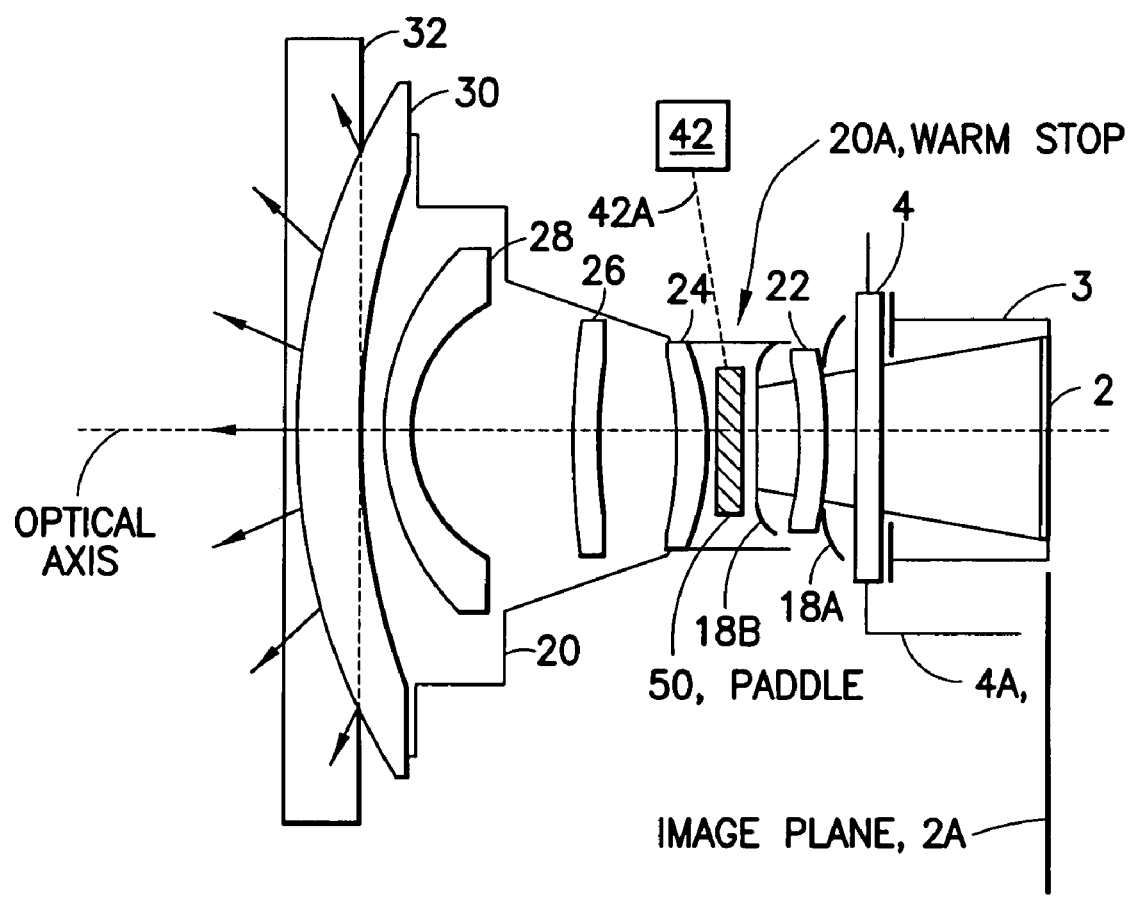
FIG. 13 is a cross-sectional view of an integrated warmshield and lens assembly that includes a paddle structure for radiometric calibration.

The improved IR sensor 1A also beneficially accommodates a radiometric calibration means, while the conventional design does not. Specifically, a blackbody paddle can be inserted for radiometric calibration, because the stop is physically accessible, in a clear space between lens elements. FIG. 13 shows such a paddle 50 that is placed immediately adjacent to the optical stop so that every detector at the image plane 2A sees approximately the same region of the paddle 50. Thermal gradients in the reference or calibration paddle 50 are less significant at the stop location since all the detector elements of the IR array 2 see the same gradients at the same time. As a result, the detector array 2 receives a uniform irradiance. In contradistinction, the conventional design of FIGS. 1 and 2 has no accessible place for such a calibration paddle, as the aperture stop is within the coldshield 3, and the spacing between the lens and the dewar window 4 is small. The space is restricted because it is difficult to project the stop very far beyond the lens elements, due to the very short focal length of a wide-angle lens.

There is only one pupil location, as the required compactness of the lens prevents the re-imaging of the stop, as was noted above.

The calibration paddle 50 shown in FIG. 13 is inserted into the location shown at times of calibration, and withdrawn during normal sensor operation. The paddle 50 can be moved in and out of the lens by a number of well-known mechanisms, shown generally as the block 42 in FIG. 13 having a mechanical linkage 42A to the calibration paddle 50. For example, a linear actuator could be used to simply slide the paddle 50 in and out of the lens. Alternatively, this can be done with a rotary mechanism with a rotary solenoid driver and a pivot point outside the lens, so that the end of the pivot arm holding the paddle 50 is swung in and out of the lens.

Figure 8:
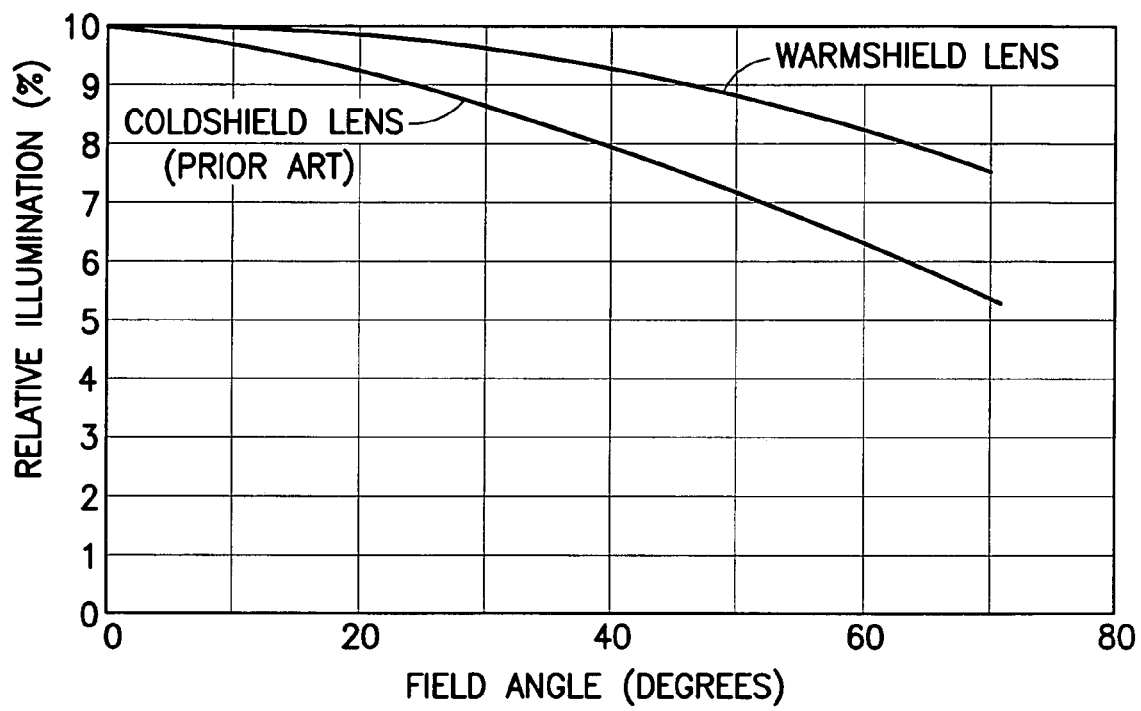
FIG. 8 is a graph that plots relative illumination versus field angle and shows an improved broad-source uniformity across an image formed by the IR sensor of FIG. 4.

In addition to the foregoing benefits, the response across the field-of-view is more uniform for the improved IR sensor 1A, because the warmstop 20A is located further from the image plane 2A. Moving the stop away from the image plane reduces angles of the imaging rays, particularly at the larger field angles, and gives a more uniform response for broad-source objects, as shown by the illumination rolloff plots in FIG. 8. The response to small objects is also enhanced for the improved IR sensor 1A, as shown by the point-source relative illumination plot of FIG. 9 for the conventional coldshield lens 1, 1' and for the improved warmshield lens 1A of this invention.

Figure 2:
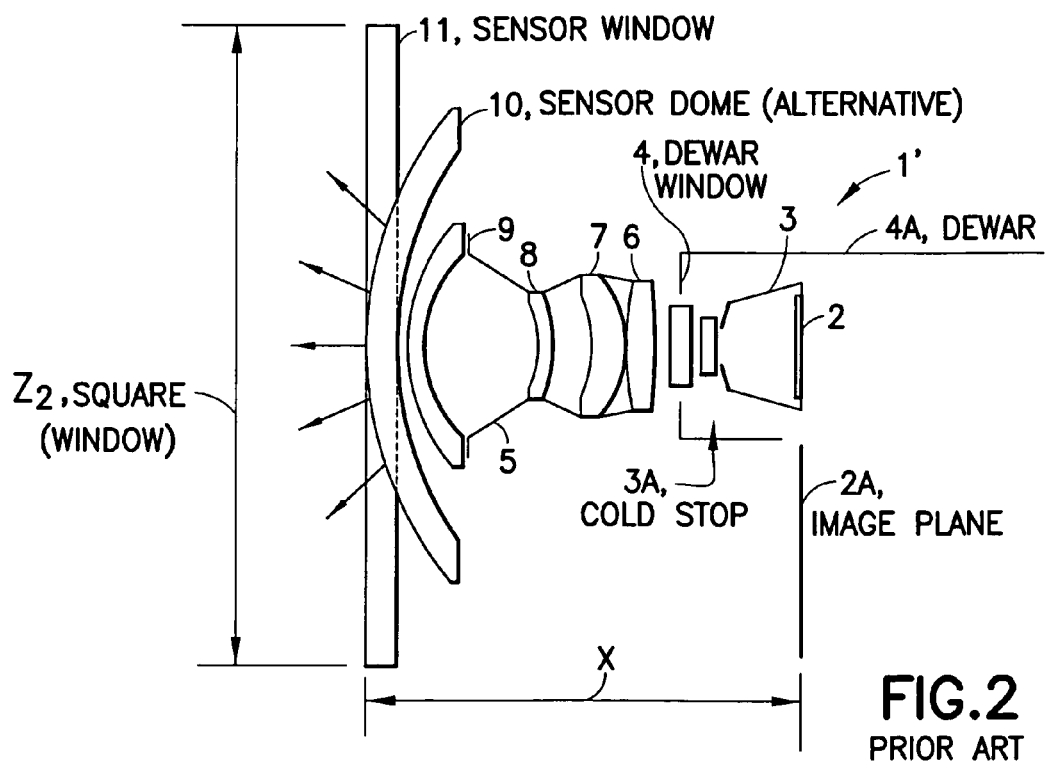
FIG. 2 is a cross-sectional view of a second embodiment of a prior art wide-angle IR sensor.
Figure 3A:
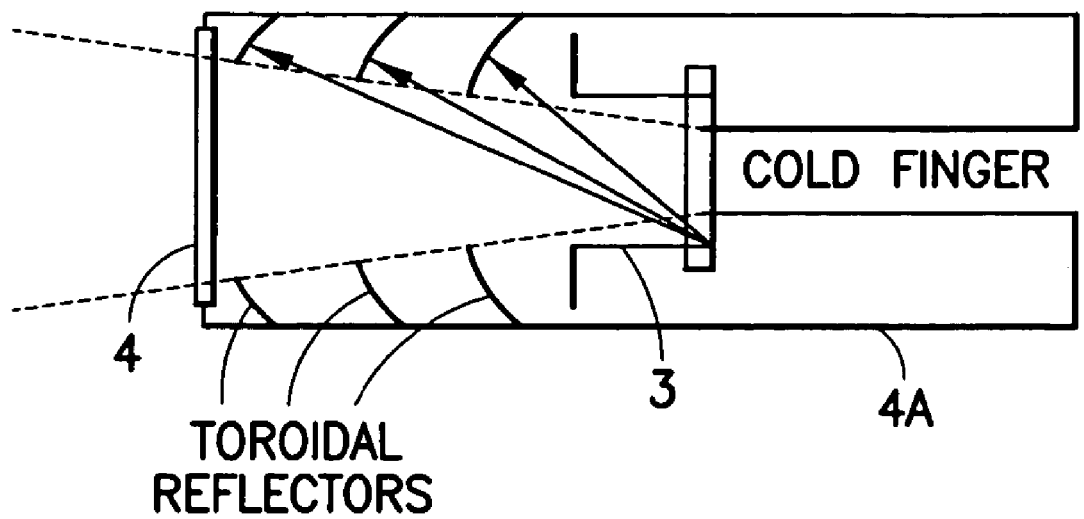
Figure 3B:
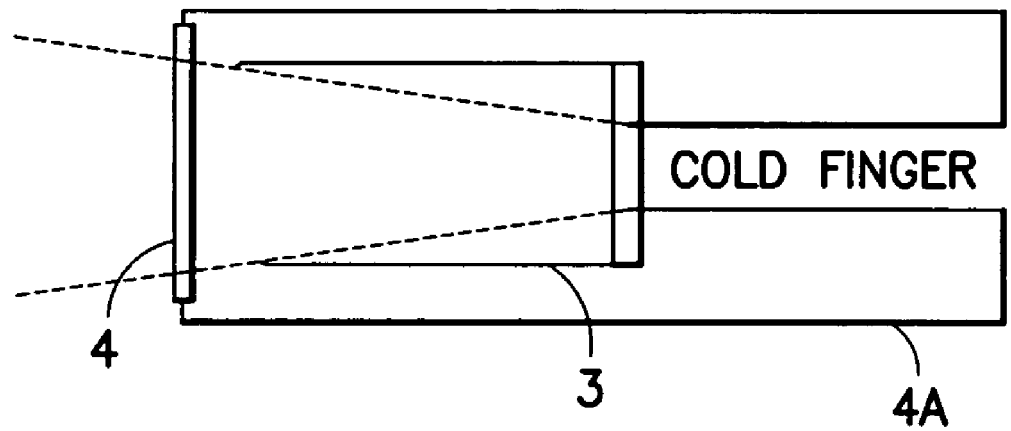
FIG. 3B shows a conventional coldshield design that is prior art to the IR sensor of FIG. 3A.
Figure 9:
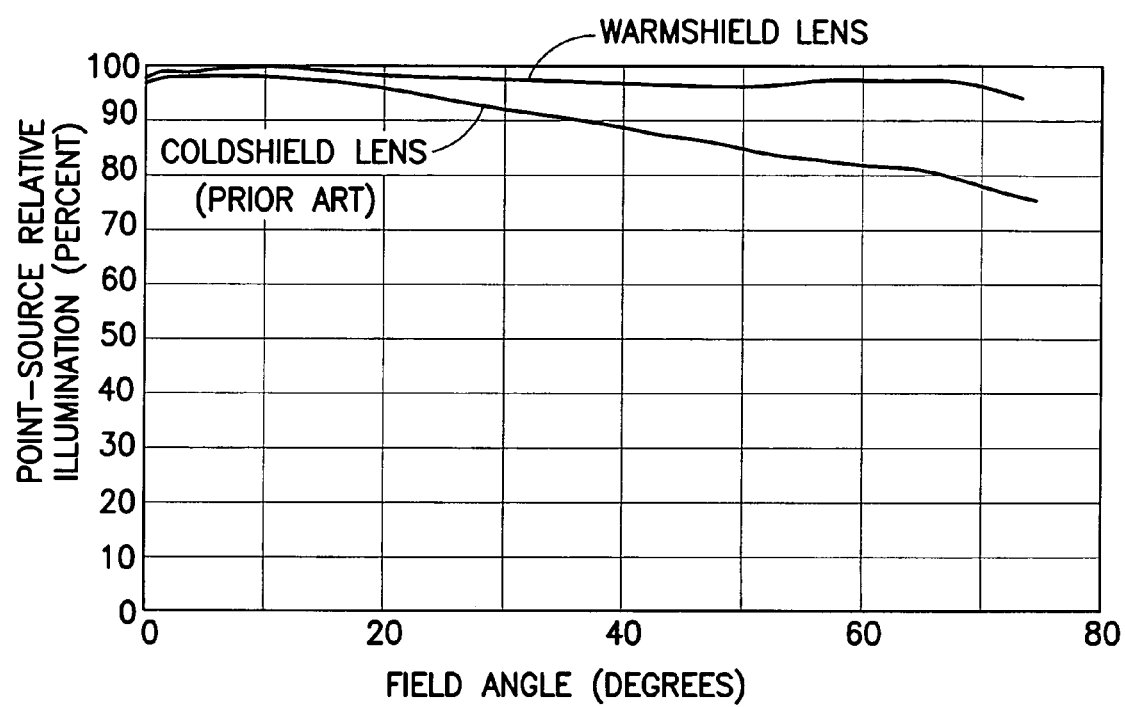
FIG. 9 is a graph that plots point-source relative illumination versus field angle and shows an improved point-source uniformity across the image formed by the IR sensor of FIG. 4.

It should be noted that in FIG. 9 the plots are normalized to 100% at full energy capture, which ignores the fact that the improved IR sensor 1A is capable of achieving approximately 110% energy capture, due to its larger collecting aperture. With the largest aperture sizes attainable in a producible lens configuration meeting the same specifications, the improved IR sensor 1A achieves full performance at f/1.9, while the conventional design of FIGS. 1 and 2 is limited to f/2.0.

The image quality is also improved by symmetry of the improved IR sensor 1A, which results from placing optical power on both sides of the warmstop 20A (i.e., lenses 24 and 22). The improved optical symmetry balances aberrations and improves quality image response. In contrast, the conventional design depicted in FIGS. 1 and 2 is very asymmetrical, since all the optical elements are located on one side of the coldstop, which makes the optical design more difficult, and reduces the imaging performance.

The manufacturability and reproduceability of the improved IR sensor 1A is also better than that of the conventional optics design. The optical symmetry of the improved IR sensor 1A naturally cancels aberrations, which the conventional design must remove by stringent figuring and placement of the optical elements. In addition, the manufacturing tolerances are tightened by the lesser balance of the conventional design, as shown in Table 1. These tighter tolerances complicate the manufacturing process and increase cost.

TABLE 1

Exemplary Manufacturing Tolerances

| Parameter | Improved Design | Conventional Design |
| --- | --- | --- |
| Element axial position | ±0.0020" to ±0.0030" | ±0.0005" |
| Element centering | ±0.0005" to ±0.0010" | ±0.0003" |

The generation of ghost images is also reduced because the improved IR sensor 1A permits the use of stronger curvatures in the lens element 28, which tends to defocus the ghost images arising from lens element 28 with dome 30 or window 32, and thus reduces their intensities. In addition, the less constrained design is more amenable to changes in the element shapes of the lens elements 22, 24, 26 and 28 that further reduces ghost imaging. FIG. 10 compares the performance of the conventional design typified by sensors 1 and 1' (coldshield lens) and the improved IR sensor 1A (warmshield lens), and shows a four times reduction in the larger ghosts that are most troublesome. The graph of FIG. 10 shows data from stray light analyses at a sun angle of +50 degrees, and for identical reflectances in the internal elements. Note that the sun and nearby ghosts are omitted from the Figure, which instead focuses on troublesome ghosts over the main portion of the field of view. The environmental conditions for FIG. 10 are identical for both the coldshield and warmshield lenses. Both are shown with the flat window 11 and 32, respectively, which serves to reduce ghost intensities as compared to the curved dome. Both are also shown with the same surface reflectances, including a strong reflectance from an uncoated outer surface of an aluminum-oxynitride window 11, 32. Both would have lesser ghost intensities if surface reflectivities were reduced from the 1% values shown, and if improved antireflection (AR) coatings are available, particularly if the AR coatings are optimized for a narrow specular bandwidth.

The wider spectral bandwidth made possible by the use of the improved IR sensor 1A enables it to be used in "two color" applications, i.e., those sensors in which the IR detector array 2 is sensitive to wavelengths in two spectral bands.

Furthermore, the compact yet wide FOV IR sensor 1A enables its use in constructing small infrared surveillance cameras that requires no mechanical pivoting, but that instead employ a fixed wide-angle camera with high resolution, together with electronic selection and pointing to sub-areas of the IR detector array 2 for display to an operator. In this case an electronic, as opposed to mechanical, scanning operation can be achieved with a camera that is not required to be mechanically driven to change its field of view.

As was discussed above, in the presently preferred embodiment of this invention the physical coldshield 3 within the dewar 4 lies close to the image plane 2A, and has a darkened forward face 3B that "fills" the virtual coldshield that is formed by the reflectors 18A, 18B. Reflectors capture all non-imaging rays that pass through the physical coldshield 3. The aperture of the outer reflector 18B defines the lens stop (warm stop 20A), while the aperture of the inner reflector 18A is large enough to avoid vignetting any imaging rays. The coldshield 3 aperture is sized to be large enough to avoid vignetting any imaging rays, and to block out as many out-of-field rays as possible. In this system, the out-of field rays are captured by the true coldshield 3, either directly (as is the usual) or indirectly by reflection.

The prior art reflective warmshield reflectors, typified by those shown in the above-referenced U.S. Pat. No. 4,820, 923, are typically made from metal. FIG. 11A shows a prior art warm shield reflector 30. The optically reflective portion of the warm shield reflector 30 is polished, either conventionally with a polishing slurry, or by a Diamond Point Turning (DPT) operation. A highly reflective evaporated coating 30A is then applied to the surface that provides the high reflectance in the IR waveband. The warm shield reflector 30 is mounted into the optical system in a manner similar to a refractive lens element 32.

Figure 11B:
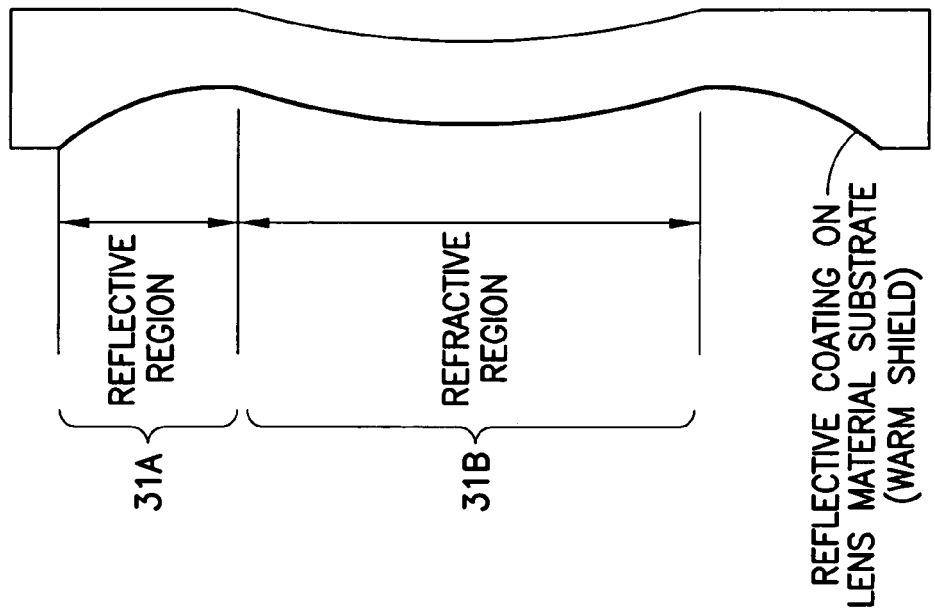
FIG. 11B is a cross-sectional view of an integrated, monolithic warmshield/lens assembly.
Figure 11A:
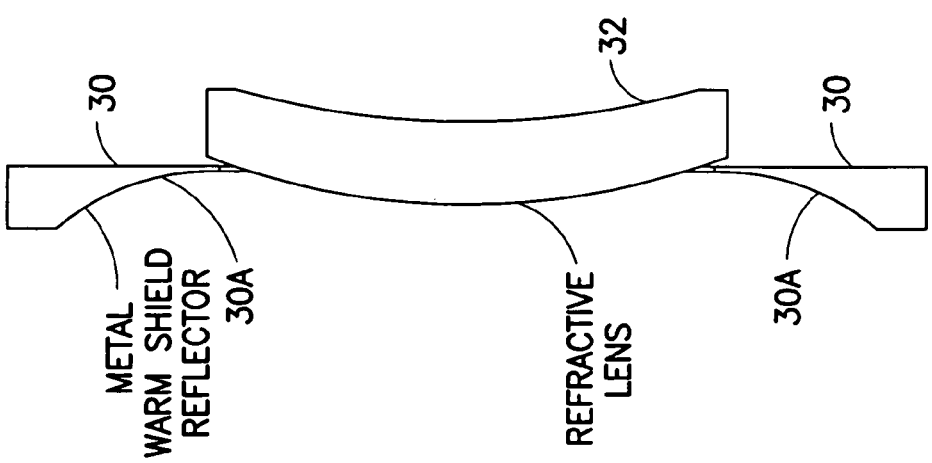
FIG. 11A is a cross-sectional view of a prior art metal warmshield and refractive lens combination.
Figure 12:
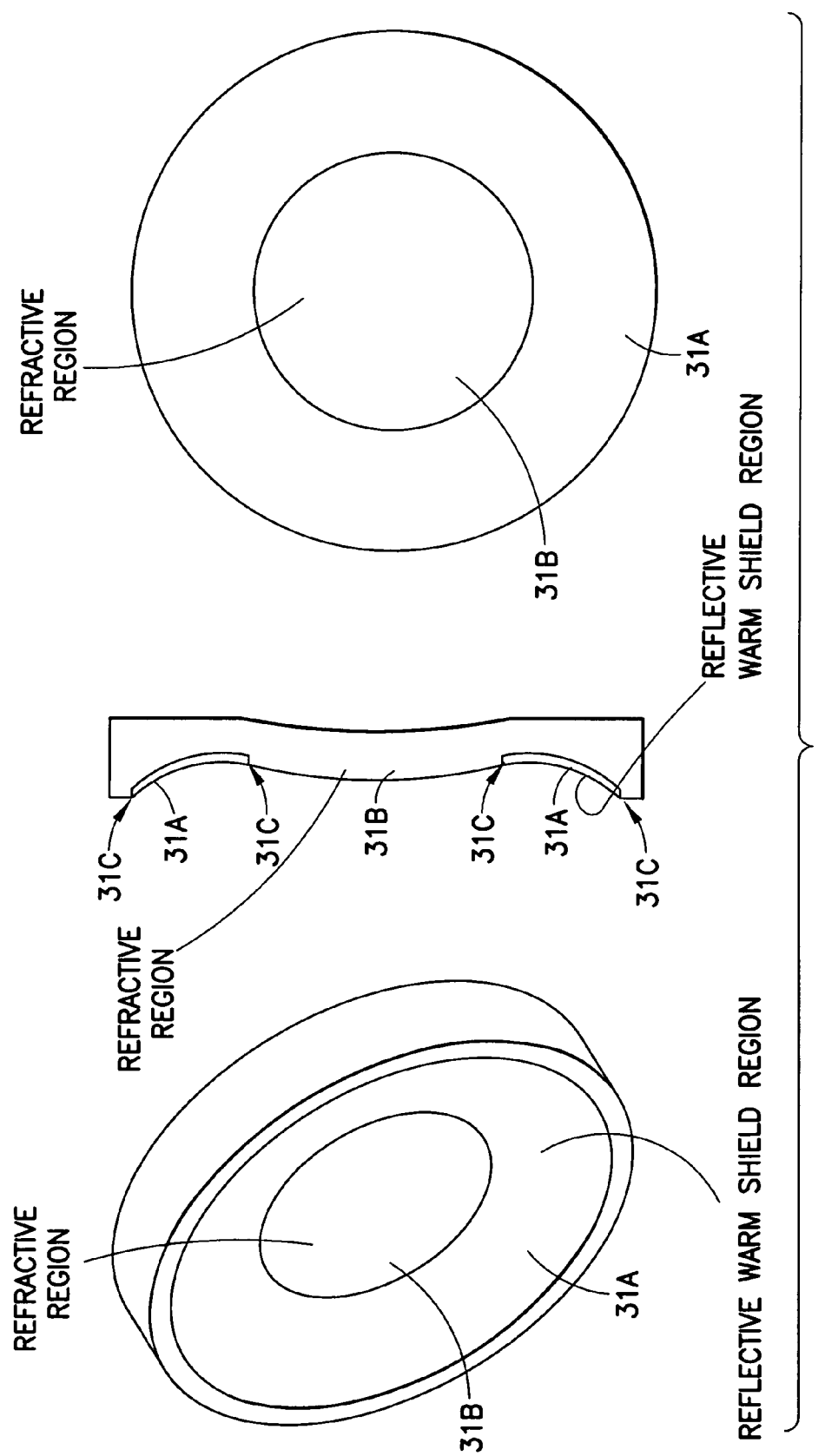
FIG. 12 shows an exemplary elevational, side and frontal view of the warmshield/lens assembly of FIG. 11B.

FIG. 11B is a cross-sectional view of an integrated, monolithic warmshield/lens assembly 31, while FIG. 12 shows an exemplary elevational, side and frontal view of the warmshield/lens assembly 31. In this embodiment the conventional separate lens 32 and the warm shield 30 itself are combined into the one element comprised of the integrated and monolithic warmshield/lens assembly 31. The warmshield/lens assembly 31 includes a central refractive region 31B that performs as the refractive lens 32 of FIG. 11A, preferably using the same optical surface curvatures and center thickness. The warmshield/lens assembly 31 also includes an outer region 31A with a reflective surface that functions as the metal warm shield 30 of FIG. 11A. The desired surface curvatures of the refractive and reflective regions 31B, 31A, respectively, are combined into a single compound optical surface.

The single warmshield/lens assembly 31 can thus be used in place of the warmshield segment 18A, and the lens 22, of FIG. 4, although in other embodiments it may be used at other locations, as well as in other types of optical systems.

In a preferred, but non-limiting embodiment the material that forms the compound optical surface is silicon, which is used in the lens prescription of the refractive part of the lens design 31B. However, any optical material can be used that is appropriate for the refractive part of the lens system, and that can be processed, such as by DPT and coating, to provide the smooth reflective portion 31A.

As was noted, Diamond Point Turning (DPT) is the preferred method of fabricating the compound optical surface. The refractive and reflective regions 31B, 31A are preferably fabricated in one operation, which reduces cost as compared to fabrication of the two separate elements 30 and 32 of the prior art design shown in FIG. 1A.

In addition, this embodiment has a more significant cost saving because of the compactness of the design at the location of the warm shield. Due to the limited space allowed, the warm shield reflector 30 is typically required to be thin, and is difficult to fabricate. An additional cost savings results from having to mount only the one element 31, as compared to the two elements 30 and 32 in the conventional design shown in FIG. 11A.

A further advantage is derived from the fact that since the compound surface of the warmshield/lens assembly 31 can be Diamond Point Turned in the same operation, the centering, tilt, and positioning of the reflective surface 31A relative to the refractive surface 31B is extremely accurate. In contradistinction, the two-element prior art design of FIG. 11A can experience an accumulation of errors caused by separate fabrication of the individual elements, separate mounting surfaces in the housing, and the two mounting steps during assembly.

In a preferred embodiment an antireflection (AR) coating is deposited on both sides of the compound optical element 31 using evaporative deposition with an optical vacuum chamber. A reflective coating, such as gold, silver, aluminum, or any suitable coating material, is then deposited on the warmshield portion 31A of the compound surface 31. The refractive central region 31B of the lens is preferably masked during the deposition of the reflective coating. A photo-mask and subsequent lift-off method is a presently preferred method of masking the refractive region 31B.

It should be noted that the reflective warmshield portion 31A exhibits less scatter from the aperture of the reflector, as compared to the prior art warmshield 30. At the thin edge of the aperture of the metal in the prior art warmshield 30, there must be some minimum thickness to assure mechanical stability. However, the resulting metal edge is a source of scatter that can result in the generation of stray radiation. In this invention, the warmshield is actually the reflective thin film on the refractive material of the lens, so there is very little scatter from the edge of the reflective aperture. While it is possible that some stray radiation may be caused by a misalignment of the reflective coating aperture edge to the transition point of the compound surface (indicated by the arrows 31C in FIG. 12), it is more straightforward to achieve a precision alignment with state of the art photomasking techniques and DPT, than it is to achieve a knife-edge metal reflector in the prior art warm shield 30.

The foregoing description has provided by way of exemplary and non-limiting examples a full and informative description of the best method and apparatus presently contemplated for carrying out the invention. However, various modifications and adaptations may become apparent to those skilled in the relevant arts in view of the foregoing description, when read in conjunction with the accompanying drawings and the appended claims. As but some examples, the use of other similar or equivalent lens materials, lens prescriptions, lens sizes and spacings, wavelength ranges, numbers of lens elements and/or reflectors having various shapes, including spherical and elliptical, may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A wide-angle infrared radiation (IR) imaging system having an entrance aperture for admitting IR from a scene, comprising:
    a dewar containing a coldshield that encloses a cooled IR detector disposed at an image plane, said dewar comprising a dewar window, an optical axis of said IR imaging system passing through said dewar window and said image plane;
    a plurality of uncooled optical elements disposed along said optical axis between said entrance aperture and said dewar window; and
    a plurality of reflector segments disposed around said optical axis between said dewar window and said entrance aperture, each of said reflector segments having a reflective surface facing said dewar window, where an opening through an outermost reflector segment furthest from said dewar window defines an effective cooled aperture stop of said IR imaging system, and where at least one of said optical elements is disposed between said effective cooled aperture stop and another one of said reflector segments that is located nearer to said dewar window.

2. A wide-angle IR imaging system as in claim 1, where said IR imaging system has a field-of-view of greater than about 30 degrees.

3. A wide-angle IR imaging system as in claim 1, where said IR imaging system has a field-of-view of greater than about 100 degrees.

4. A wide-angle IR imaging system as in claim 1, where each of said reflector segments has a reflective surface that is shaped to image each point on said IR detector onto a cooled surface.

5. A wide-angle IR imaging system as in claim 4, where said cooled surface comprises an outer face of said coldshield, said outer face facing said dewar window.

6. A wide-angle IR imaging system as in claim 4, where said surface shape defines a generally toroidal surface shape.

7. A wide-angle IR imaging system as in claim 4, wherein said cooled surface further comprises at least one surface within said coldshield.

8. A wide-angle IR imaging system as in claim 1, where said plurality of reflector segments capture substantially all non-imaging rays that pass through said coldshield, where an opening through an innermost reflector segment closest to the dewar window, and an opening though said coldshield, are sized to avoid vignetting imaging rays.

9. A wide-angle IR imaging system as in claim 1, further comprising a flat window disposed at said entrance aperture.

10. A wide-angle IR imaging system as in claim 1, further comprising a domed window disposed at said entrance aperture.

11. A wide-angle IR imaging system as in claim 1, where said at least one optical element and reflector segment are comprised of a single monolithic body having a compound optical surface.

12. A wide-angle IR imaging system as in claim 11, where said monolithic body is comprised of a material selected for fabricating a refractive lens element, said compound optical surface comprising a centrally located convex portion defining said lens element surrounded by a generally toroidal surface region having a reflective coating that defines said reflector segment.

13. A wide-angle IR imaging system as in claim 12, where said centrally located convex portion is coated with an anti-reflection coating.

14. A wide-angle IR imaging system as in claim 11, where said compound optical surface is formed using a diamond point turning operation.

15. A wide-angle IR imaging system as in claim 1, further comprising a calibration paddle disposed, in a calibration position, along said optical axis between said effective cooled aperture stop and said entrance aperture.

16. A wide-angle IR imaging system as in claim 15, where said calibration paddle is moveable for being disposed, when not in the calibration position, away from said optical axis.

17. An IR imaging system as in claim 1, wherein said coldshield comprises an outer face, wherein said other reflector segment is oriented such that rays do not cross said optical axis when reflected off said reflective surface of said other reflector segment and upon said outer face of said coldshield.

18. A wide-angle IR imaging system as in claim 1, wherein a clear space for a thermal reference is provided adjacent to the effective cooled aperture stop defined by said outermost reflector segment, and where the reference object comprises a removable paddle that is inserted for calibration and removed for imaging.

19. A method for operating a wide-angle infrared radiation (IR) imaging system having an entrance aperture for admitting IR from a scene, said IR imaging system having a dewar that contains a coldshield that encloses a cooled IR detector array disposed at an image plane, said dewar comprising a dewar window, where an optical axis of said IR imaging system passes through said dewar window to said image plane, the method comprising:
    providing along said optical axis between said entrance aperture and said dewar window a plurality of uncooled optical elements and a plurality of reflector segments, each of said reflector segments having a generally annular reflective surface facing said dewar window, said reflective surface surrounding an IR transmission path region through said reflector segment;
    defining an effective cooled aperture stop of said IR imaging system as being coincident with said IR transmission path region through a reflector segment that is furthest from said dewar window; and locating at least one of said optical elements between said effective cooled aperture stop and another one of said reflector segments that is located nearer to said dewar window.

20. A method as in claim 19, where said IR imaging system has a field-of-view of greater than about 30 degrees.

21. A method as in claim 19, where each of said reflector segments has a generally toroidal surface that is shaped to image each point on said IR detector onto a cooled surface.

22. A method as in claim 19, where said at least one optical element and the another one of said reflector segments are comprised of a single monolithic body having a compound optical surface, said monolithic body being comprised of a material selected for fabricating a refractive lens element, said compound optical surface comprising a centrally located convex portion defining said lens element surrounded by a generally toroidal surface region having a reflective coating that defines said reflector segment.

23. A method as in claim 19, further comprising inserting a calibration paddle into a calibration position along said optical axis between said effective cooled aperture stop and said entrance aperture.

24. A method as in claim 19, wherein said coldshield comprises an outer face, wherein said other reflector segment is oriented such that rays do not cross said optical axis when reflected off said reflective surface of said other reflector segment and upon said outer face of said coldshield.

25. An infrared radiation (IR) imaging system having an entrance aperture for admitting IR from a scene, said IR imaging system comprising a dewar that contains a coldshield that encloses a cooled IR detector array disposed at an image plane, said dewar comprising a dewar window, where an optical axis of said IR imaging system passes through said dewar window to said image plane; a plurality of uncooled optical elements and a plurality of reflector segments disposed along said optical axis between said entrance aperture and said dewar window, each of said reflector segments having a generally annular reflective surface facing said dewar window, said reflective surface surrounding an IR transmission path region through said reflector segment; where an effective cooled aperture stop of said IR imaging system is coincident with said IR transmission path region through a reflector segment that is furthest from said dewar window; and where at least one of said optical elements is disposed between said effective cooled aperture stop and another one of said reflector segments that is located nearer to said dewar window.

26. An IR imaging system as in claim 25, where a field-of-view of said imaging system is greater than about 30 degrees.

27. An IR imaging system as in claim 25, where each of said reflector segments has a generally toroidal surface that is shaped to image each point on said IR detector onto a cooled surface.

28. An IR imaging system as in claim 25, where said at least one optical element and the another one of said reflector segments are comprised of a single monolithic body having a compound optical surface, said monolithic body being comprised of a material selected for fabricating a refractive lens element, said compound optical surface comprising a centrally located convex portion defining said lens element surrounded by a generally toroidal surface region having a reflective coating that defines said reflector segment.

29. An IR imaging system as in claim 25, further comprising means for inserting a calibration paddle into a calibration position along said optical axis between said effective cooled aperture stop and said entrance aperture.

30. An IR imaging system as in claim 25, wherein said coldshield comprises an outer face, wherein said other reflector segment is oriented such that rays do not cross said optical axis when reflected off said reflective surface of said other reflector segment and upon said outer face of said coldshield.

31. A wide-angle infrared radiation (IR) imaging system having an entrance aperture for admitting IR from a scene and an image plane upon which the scene is imaged, comprising:
   a dewar that encloses a cooled IR detector disposed at the image plane, said dewar comprising an outer window, a coldshield, and said detector;
   a multi-element lens that comprises a plurality of uncooled optical elements disposed along the optical axis between said entrance aperture and said dewar window;
   an optical stop disposed within said uncooled optical elements such that lens optical power is distributed on both sides of the optical stop; and
   at least one reflector element comprising at least one inner opening and at least one surface having a generally toroidal surface shape, and having one of the at least one inner openings placed substantially coincident with said optical stop.

32. A wide-angle IR imaging system as in claim 31, wherein said lens optical power is substantially balanced on both sides of said optical stop.

33. A wide-angle IR imaging system as in claim 31, wherein a clear space for a thermal reference is provided adjacent to said optical stop.

34. A wide-angle IR imaging system as in claim 33, wherein said thermal reference comprises a removable paddle that is inserted for calibration and removed for imaging.

35. A wide-angle IR imaging system as in claim 31, wherein at least one of the plurality of uncooled optical elements and at least a given one of the at least one reflector segments are comprised of a single monolithic body having a compound optical surface.

36. A wide-angle IR imaging system as in claim 31, wherein the at least one reflector elements comprises at least two reflector elements, and wherein at least one of said uncooled optical elements is disposed between a pair of said at least two reflector elements.

* * * * *